April 2, 1935.　　　　　S. S. VARKAS　　　　　1,996,532
CLUTCH OPERATING MECHANISM
Original Filed Sept. 29, 1931
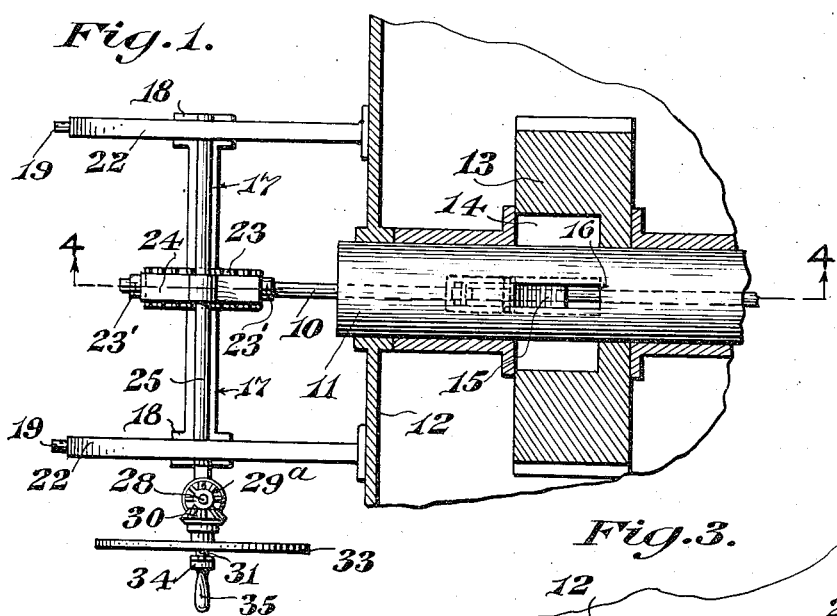
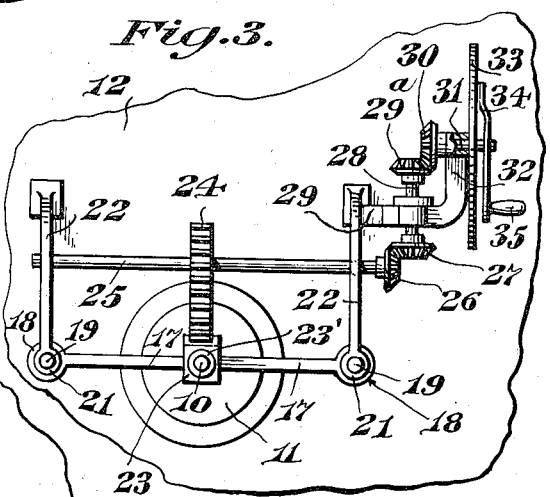
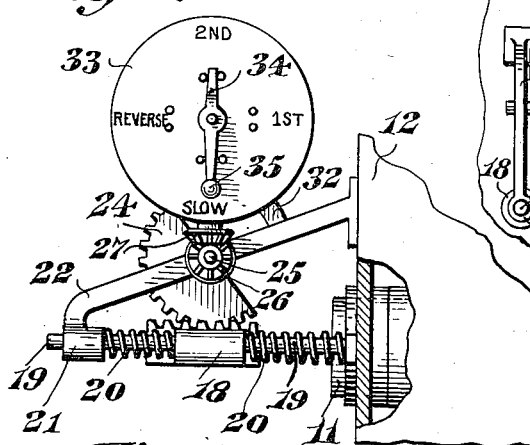
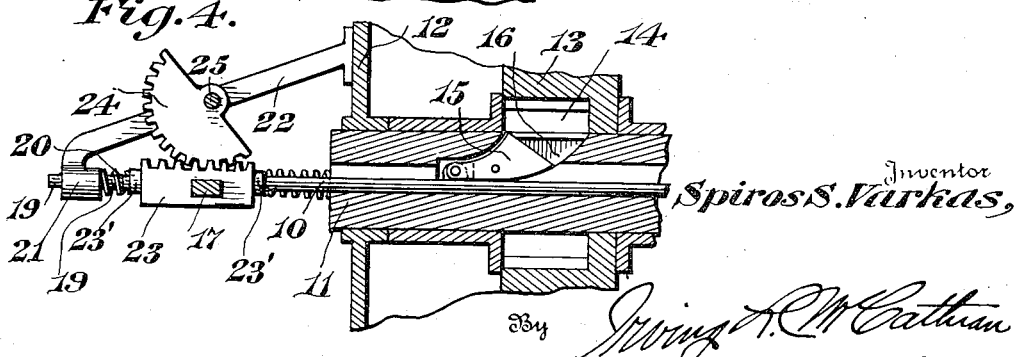
Inventor
Spiros S. Varkas,
By
Attorney Patented Apr. 2, 1935

1,996,532

UNITED STATES PATENT OFFICE 1,996,532

CLUTCH OPERATING MECHANISM

Spiros S. Varkas, New York, N. Y.

Original application September 29, 1931, Serial No. 565,835. Divided and this application October 12, 1933, Serial No. 693,361

4 Claims. (Cl. 192—82)

This invention relates to a clutch operating mechanism particularly adapted for operating a clutch which is specially designed for locking a gear in engagement with a supporting shaft such as has been described in my copending application Serial Number 565,835, filed September 29, 1931, relating to a Clutch mechanism.

A further object of this invention is the production of a simple and efficient clutch operating mechanism which is so constructed as to facilitate the operation of the clutch, the parts of the operating mechanism being simple in construction, minimum in number, and economical.

A further object of this invention is the production of a simple and efficient clutch operating mechanism particularly designed for use in conjunction with speed changing devices, the clutch operating mechanism being so constructed as to permit the operator to readily determine the various settings of the speed changing mechanism.

This application is a division from my previous application filed September 29, 1931, relating to a Clutch mechanism, Serial Number 565,835.

Other objects and advantages of the present invention will appear throughout the following specification and claims.

In the drawing:—

Figure 1 is a longitudinal sectional view through a portion of the speed changing mechanism illustrating the clutch control mechanism in top plan view, one of the gears and shaft supporting means being shown in section;

Figure 2 is a side elevation of the structure shown in Figure 1, certain parts being shown in section;

Figure 3 is a front elevation of the structure shown in Figure 1; and

Figure 4 is a section taken on the line 4—4 of Figure 1.

By referring to the drawing, it will be seen that 10 indicates the adjusting rod which adjusting rod is slidably mounted longitudinally through the shaft 11, the shaft 11 being supported by the casing 12 in which the speed gearing is mounted, as shown in Figure 1. A gear 13 is mounted upon the shaft 11 in any suitable or desired manner, and is provided with a cut-away portion 14 for receiving the key 15, which key is slidably mounted through the opening 16 formed in the shaft 11, the key being connected to the rod 10, as shown in Figure 4. Consequently, by shifting the rod 10 longitudinally, it will be seen that the key 15 may be moved into and out of clutching engagement with the gear 13 as clearly brought out in my co-pending application above identified, from which the present application is a division.

The adjusting rod 10 supports at its outer end a cross head 17 having sleeve-like members 18 formed at the respective ends thereof, which sleeve-like members 18 are slidably mounted upon the arms or guides 19 between the expansion springs 20 mounted upon the arms or stems 19 and upon either side of the sleeves 18, as shown clearly in Figure 2. The springs 20 act against opposite ends of the sleeves 18 to yieldably resist movement of the cross head and rod 10 longitudinally of the rod and guides in either direction out of a normal position in which the gear 13 is released from the shaft 11. These springs also serve to retain the cross head at right angles to the rod 10 and guides 19 and therefore when the cross head is shifted to move the rod longitudinally it will be prevented from becoming canted and causing binding to occur between the guides and sleeves 18. The outer ends of these arms or guides 19 are fitted within the socket members 21 carried by the braces 22, which braces are arranged in inclined relation and extend upwardly at an angle and are secured to the casing or frame 12, as clearly shown in the drawing.

For the purpose of facilitating the operation of the adjusting rod 10, a rack 23 forming part of the cross head fits loosely upon the rod between stop collars 23' which are firmly secured in place by set screws, and as clearly shown in Figures 3 and 4 this rack meshes with a gear 24 carried by a shaft 25 journaled between the spaced braces 22.

The shaft 25 carries a bevel gear 26 which meshes with a bevel gear 27 carried by a vertically extending shaft 28 journaled upon the bracket 29, as shown in Figure 3. The shaft 28 also carries a bevel gear 29ª at its upper end, which bevel gear meshes with a bevel gear 30 carried by the shaft 31 journaled upon the vertically extending arm 32 of the bracket 29. This shaft 31 constitutes an indicator shaft and a suitable indicating disc 33 is supported in any suitable or desired manner upon the bracket 29 and in any suitable or convenient position for the purpose of permitting the indicating hand 34 to indicate the position of the adjusting rod 10. The indicating hand 34 is carried by the indicator shaft 31 and this hand 34 is provided with an operating handle 35. Suitable legends may be placed upon the disc 33, as shown in Figure 2 to indicate the relative position of the gears which are controlled by means of the adjusting rod 10.

Only one gear 13 has been illustrated upon the shaft 11 and it should be understood that any number of gears necessary to accomplish the desired purpose may be used, such as is illustrated in my co-pending application from which the present application is a division, and it is thought unnecessary to elaborately illustrate this gear changing mechanism in view of the fact that the present divisional application relates to the clutch operating mechanism particularly described above and illustrated in the drawing.

During operation of this apparatus, the shaft 11 and the rod 10 rotate together and unless the gear 13 is keyed to the shaft, it will remain idle. It is understood that a number of gears 13 are carried by the shaft 11 and a co-operating key 15 is provided for each gear. In order to cause the gear 13 to turn with the shaft, the rod 10 is slid longitudinally toward the right in Figure 4, and during such movement the key 15 will slide forwardly through the slot or opening 16 into the pocket 14 of the gear. Sliding of the rod is effected by grasping the handle 35 of the pointer or hand 34, and turning this hand to impart rotary motion to the shaft 31. When this shaft turns, rotary motion is transmitted through the train of gearing shown in Figure 3 to the shaft 25 and the segmental gear 24 will be turned to impart movement to the rack 23 forming part of the cross head. Since the cross head fits loosely about the rod 10 between the collars 23' the rod may continue to rotate with the shaft, but movement of the cross head will cause pressure to be exerted upon one of the collars and the rod will be shifted longitudinally. During this movement the sleeves 18 of the cross head slide along the arms or guides 19 and as the sleeves are disposed between the springs 20, the springs will serve to yieldably resist sliding movement of the cross head and retain the cross head at right angles to the guides and rod. Therefore the sleeves cannot become canted and cause binding to take place between the sleeves and arms about which they fit. As the springs engage the sleeves from opposite ends thereof they will tend to normally retain the cross-head and rod in a position in which the gears are free from the shaft 11 and therefore return of the cross head and rod to a vertical position will be facilitated. It should also be noted that as the cross head is retained at right angles to the rod during shifting of the cross head, this rod will be prevented from having side strain applied to it and it will not be liable to become bent or caused to bind in the bore of the shaft.

It should be understood that certain detail changes in the mechanical construction may be employed without departing from the spirit of the invention so long as such changes fall within the scope of the appended claims.

Having described the invention, what is claimed as new is:—

1. A clutch operating mechanism of the class described comprising an adjusting rod adapted to throw the gears of a speed changing device into and out of engaging position, a cross head carried by said adjusting rod, a rack carried by said cross head, supporting members for said cross head, means for resiliently engaging said cross head and adapted to urge the cross head and rod in opposite directions and yieldably hold the rod in its normal position, a segmental gear engaging said rack, means for turning said segmental gear for shifting said rack and moving said adjusting rod longitudinally, and bracing means engaging said supporting members.

2. A clutch operating device comprising a rod slidable longitudinally, a cross head carrying a rack supported in engagement with said rod and movable therewith, guide means for said cross head, a gear engaging said rack, an indicating disk having legends thereon to indicate positions of the adjusting rod, a rotary shaft extending through said disk centrally thereof, an indicating hand extending diametrically of said disk and carried by said shaft and constituting a turning handle for the shaft, means connecting said shaft with said gear for imparting rotation to the gear as the hand is swung to rotate the shaft and shift the adjusting rod longitudinally, and means for yieldably resisting longitudinal shifting of the rod and cross head in either direction and preventing canting of the cross head into position for binding against its guide means.

3. A clutch operating device comprising a rod slidable longitudinally, supporting arms spaced from opposite sides of said rod, a cross head having a rack loose upon said rod and provided with laterally extending portions carrying sleeves slidably mounted upon said arms, abutments carried by said rod and engaging opposite ends of said rack, springs carried by said arms and engaging opposite ends of said sleeves to yieldably resist movement of the cross head and rod and retain the cross head at right angles to the rod and arms whereby the sleeves will slide easily along said arms and the rod will be held against lateral strain, braces for said arms, a shaft rotatably carried by said braces and extending transversely of said rod, a gear carried by said shaft and engaging said rack for shifting the cross head and rod when the shaft is rotated, and means for rotating said shaft.

4. In a clutch operating mechanism, an actuating rod slidable longitudinally, guides spaced from opposite sides of said rod and extending parallel thereto, a cross head extending transversely of said rod and having portions slidably engaged with said guides and its intermediate portion engaging said rod to shift the rod longitudinally when the cross head is shifted, means for shifting said cross head, and means for yieldably resisting movement of the cross head along said guides and retaining the cross head at right angles to the rod and guides to prevent canting of the cross head and consequent binding between the guides and portions of the cross head slidably engaged therewith.

SPIROS S. VARKAS.